United States Patent [19]

Dockery

[11] 4,094,788
[45] June 13, 1978

[54] AQUARIUM GRAVEL CLEANER

[76] Inventor: Denzel J. Dockery, 3317 E. Bristol Rd., Flint, Mich. 48507

[21] Appl. No.: 701,883

[22] Filed: Jul. 1, 1976

[51] Int. Cl.$^2$ .............................................. E04H 3/20
[52] U.S. Cl. ..................................... 210/169; 119/5
[58] Field of Search ................ 119/5; 210/169; 15/1.7

[56] References Cited

U.S. PATENT DOCUMENTS

| | | | |
|---|---|---|---|
| 2,725,356 | 11/1955 | Lombardi | 119/5 X |
| 3,039,122 | 6/1962 | Birdsall | 15/1.7 |
| 3,132,364 | 5/1964 | Oxley | 15/1.7 |
| 3,826,371 | 7/1974 | Adamson | 210/169 |

*Primary Examiner*—Hugh R. Chamblee
*Attorney, Agent, or Firm*—Gifford, Chandler, VanOphem, Sheridan & Sprinkle

[57] ABSTRACT

For use in conjunction with an aquarium having a layer of gravel, aggregate, or the like along its bottom, a device for removing the aggregate from the aquarium, cleaning the aggregate, and thereafter returning the aggregate to the aquarium. The device comprises a housing having an upper and a lower chamber with the upper chamber open to the lower chamber. A hinged closure lid sealingly covers and forms the bottom wall of the lower housing chamber. A fluid outlet from the upper chamber is coupled to the intake line of an aquarium pump while a tube is coupled at one end to an inlet in the upper chamber and is open at its other end to the aggregate in the aquarium. A sieve is operatively disposed between the inlet and outlet in the upper housing chamber so that aggregate drawn up through the tube and into the upper chamber by the pump is retained within the chamber while the filtrate is drawn through the sieve and out through the fluid outlet. Thereafter the aggregate drops through the opening and is collected in the lower housing chamber. A push rod is mounted to the housing and, upon depression, opens the closure lid and returns the cleaned aggregate to the aquarium.

19 Claims, 6 Drawing Figures

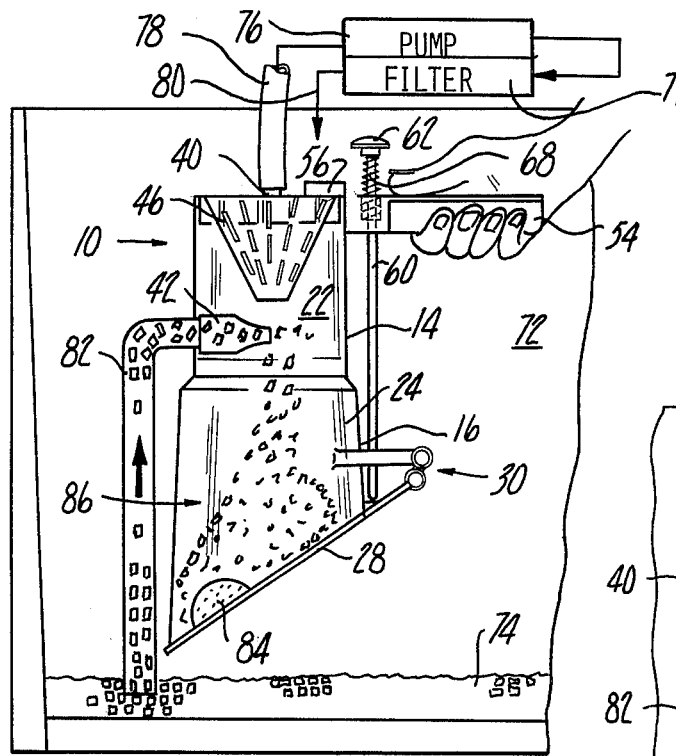
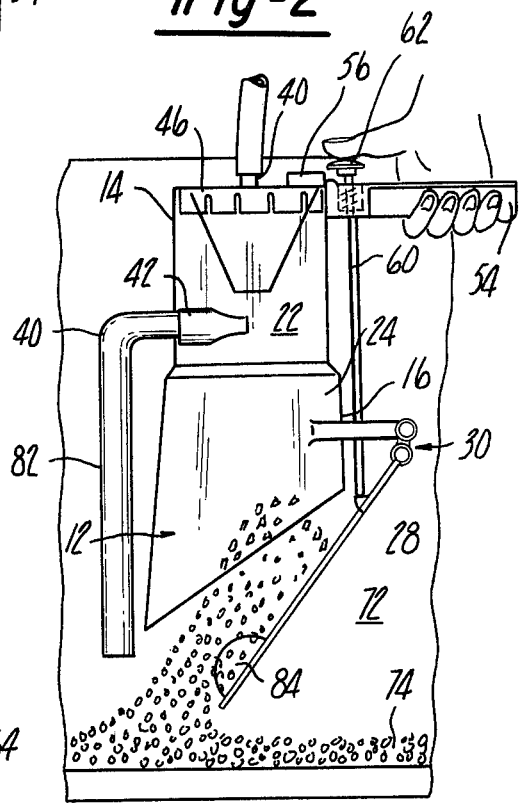
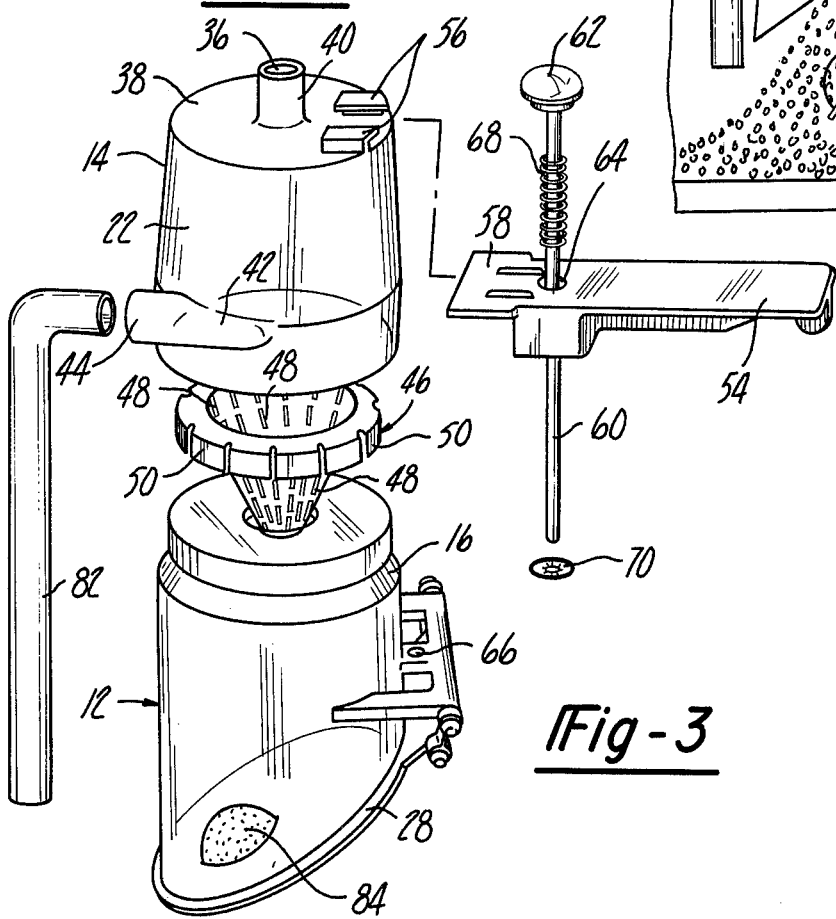

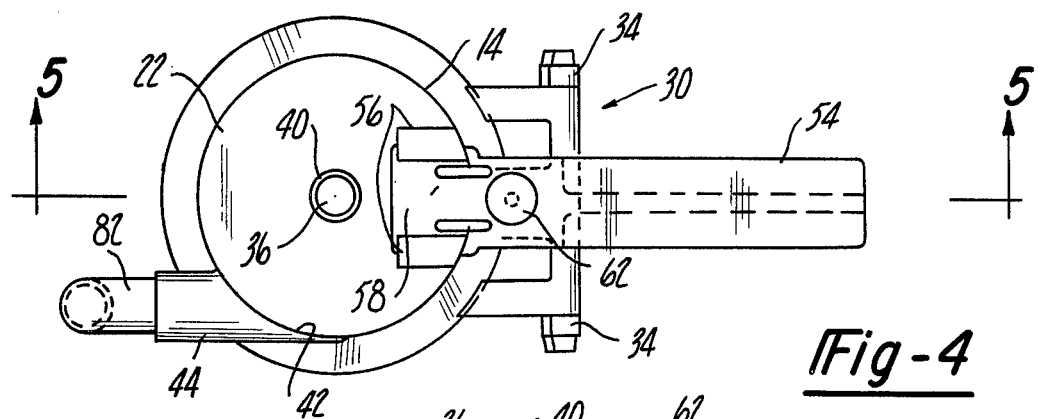
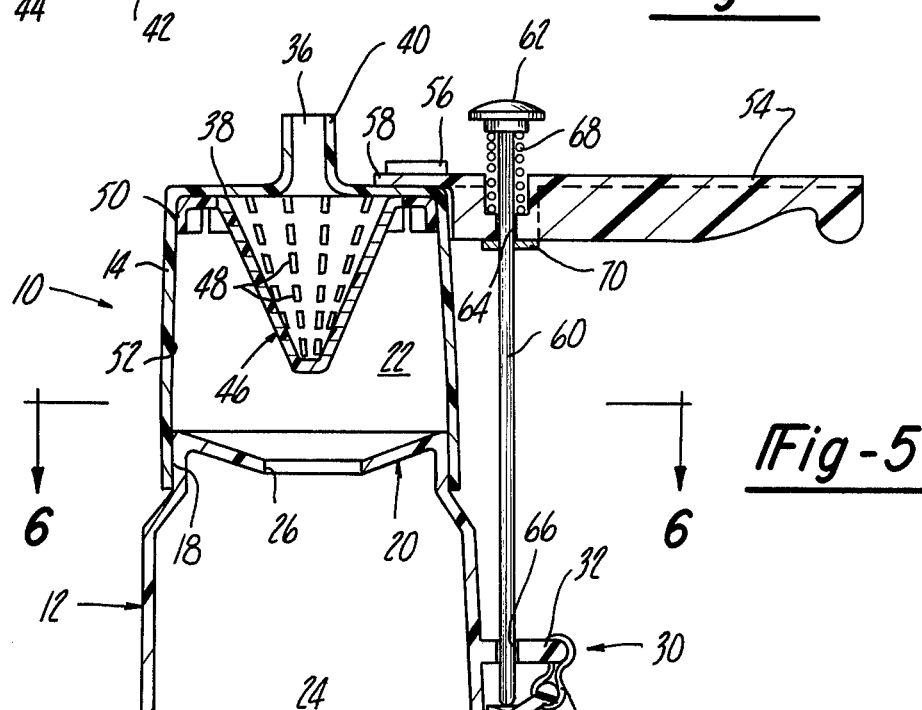
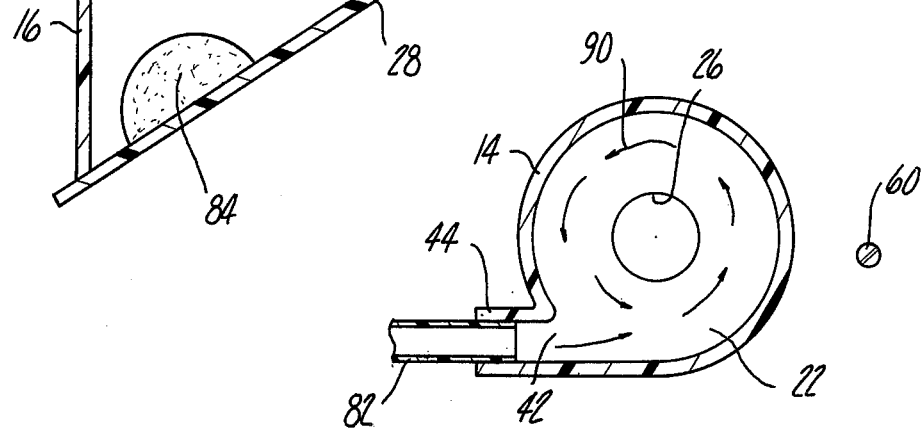

AQUARIUM GRAVEL CLEANER

BACKGROUND OF THE INVENTION

I. Field of the Invention

The present invention relates generally to aquarium devices, and, more particularly, to such a device adapted to remove aggregate, gravel, or the like from the bottom of the aquarium, wash the aggregate and thereafter return the cleaned aggregate to the aquarium.

II. Description of the Prior Art

Fish aquariums have enjoyed increased popularity for both home and office use. Such aquariums typically include a pump and filter arrangement to remove fish waste and other impurities from the aquarium water. In addition, for aesthetic purposes, the bottom of the aquarium is often covered with a layer of gravel, aggregate or the like, hereinafter referred to as gravel, which may be colored to further enhance the appearance of the aquarium.

Even though many improvements and advances have been achieved in the field of aquarium filtering systems, in practice after prolonged use of the aquarium, a quantity of fish waste and other aquarium debris accumulates along the bottom of the aquarium and tends to adhere to the gravel. This accumulation of debris and waste provides an unsightly and undesirable appearance for the aquarium and necessitates cleaning the gravel in the aquarium.

No previous aquarium attachment has been heretofore known for adequately cleaning the aquarium gravel without removing the aquarium water. As a result when cleaning of the gravel is necessitated, it has been the prior practice to capture the fish and other aquatic animals within the aquarium and to store them in temporary containers. Thereafter, the aquarium water is removed or drained away from the tank and the gravel is cleaned or simply replaced. The aquarium water and the aquatic animals are then finally returned to the aquarium.

This previously known method of cleaning aquarium gravel is disadvantageous in that it is not only time consuming but is also a messy and undesirable job.

SUMMARY OF THE PRESENT INVENTION

The present invention solves the difficulties of cleaning aquarium gravel by providing a device which removes the gravel from the aqurium, washes it and thereafter returns the cleaned gravel to the aquarium.

In brief the device of the present invention comprises a housing having an upper and a lower chamber. The upper chamber is open to the lower chamber and a hinged closure lid encloses and forms the bottom wall of the lower chamber. A fluid outlet on the upper chamber is adapted to be coupled to the intake line of an aquarium filter pump while one end of a tube is connected to a fluid inlet in the upper housing chamber. A sieve is operatively disposed in the upper housing chamber between the fluid inlet and the outlet.

In operation the pump draws water up through the tube, into the upper chamber, through the sieve and out through the fluid outlet. Thus as the other end of the tube engages the aquarium gravel, the gravel is drawn up through the tube and into the upper chamber. The sieve retains the gravel within the upper chamber while the fluid flow washes the debris from the aquarium gravel. The water carrying the debris then flows through the sieve and out through the fluid outlet. Once cleaned the gravel drops into the lower housing chamber.

The cleaned gravel accumulates and collects within the lower housing chamber. When desired, the closure lid is opened by means of a push rod mounted to the housing which dumps the cleaned gravel back into the aquarium. It will be appreciated that this procedure is repeated until the desired amount of gravel within the aquarium has been cleaned.

In contrast to the previously known methods, the device of the present invention provides a means for washing the accumulated debris and waste from the aquarium gravel without the removal of either the fish or the aquarium water from the aquarium tank.

BRIEF DESCRIPTION OF THE DRAWINGS

A better understanding of the present invention will be had upon reference to the following detailed description when read in conjunction with the accompanying drawing wherein like reference characters refer to like parts throughout the several views and in which:

FIG. 1 is a fragmentary side plan view showing the device of the present invention removing gravel from the bottom of an aquarium tank;

FIG. 2 is a fragmentary side plan view similar to FIG. 1 but showing the device of the present invention returning cleaned gravel to the bottom of the aquarium tank;

FIG. 3 is an exploded perspective view showing the device of the present invention;

FIG. 4 is a top plan view showing the device of the present invention;

FIG. 5 is a sectional view taken substantially along line 5—5 in FIG. 4; and

FIG. 6 is a sectional view taken substantially along line 6—6 in FIG. 5.

DETAILED DESCRIPTION OF THE PRESENT INVENTION

With reference first particularly to FIGS. 3-6, the device 10 of the present invention is there shown and comprises a two part housing 12 having an upper portion 14 and a lower portion 16 each of which is preferably constructed of transparent plastic for low cost manufacture. Each of the housing portions 14 and 16 is substantially tubular and cylindrical in cross sectional shape and open at its lower axial end. The lower housing portion 16 is of a larger diameter than the upper housing portion 14 but includes an upper reduced diameter section 18 which is received within the interior of the upper housing portion 14. The reduced diameter section 18 is dimensioned so that when inserted into the upper housing portion 14, the housing portions 14 and 16 are frictionally maintained together.

An upper wall 20 of the lower housing portion 16 concaves downwardly and divides the housing 12 into an upper interior chamber 22 and a lower interior chamber 24. A restricted opening 26 through the upper wall 20 of the lower housing portion 16 permits fluid communication between the chambers 22 and 24.

A closure lid 28 is pivotally mounted to the lower housing portion 16 by a hinge 30. Although the hinge 30 may comprise any conventional construction, as shown, it includes an outwardly protruding hinge bracket 32 integrally formed with the lower housing portion 16 and pivotally coupled to the closure lid 28 by hinge snaps 34. The closure lid 28 is movable between a closed position covering the lower axial end of the lower housing portion 16, shown in FIG. 5, and an open position, shown in FIG. 2, in a manner to be hereinafter described in greater detail.

Still referring to FIGS. 3-6, a fluid outlet 36 is formed by a tubular extension 40 which extends axially outwardly from an upper wall 38 of the upper housing portion. The tubular extension 40 provides a convenient means for connection to a fluid conduit. A fluid inlet 42 is coupled to a sidewall of the upper housing portion 14 and likewise includes a tubular extension 44 for connection to a fluid conduit. Unlike the outlet 36, however, the inlet 42 intersects the chamber 22 tangentially for a reason to be later described.

A sieve 46 having a plurality of openings 48 formed therethrough, is disposed within the upper housing chamber 22 between the fluid inlet 42 and the fluid outlet 36. Preferably the sieve 46 is conical in cross sectional shape and is axially disposed within the chamber 22 so that the apex of the sieve 46 points axially downwardly toward the lower housing portion 16. Moreover for ease of cleaning, the sieve 46 is preferably detachably secured within the upper housing chamber 22 and for this purpose includes a plurality of resilient fingers 50 circumferentially spaced around its periphery. The fingers 50 frictionally engage the interior walls 52 (FIG. 5) of the upper housing portion 14 and maintain the sieve 46 within the chamber 22.

With reference to FIGS. 3, 4, and 5, a pair of facing channel guides 56 are formed on the upper wall 38 of the upper housing portion 14. The guides 56 slidably receive a protruding portion 58 of a handle 54 therebetween so that the handle 54 extends radially outwardly from the upper housing portion 14. The handle 54 can be detached from the housing portion 14 by sliding the handle 54 radially away from the housing 12.

An elongated push rod 60 having an upper enlarged diameter portion 62 is disposed through a vertical bore 64 in the handle 54 and a bore 66 in the hinge bracket 32 so that the lower end of the push rod 60 abuts against the closure lid 28 adjacent the hinge arrangement 30. A helical spring 68 is provided around the push rod 60 between the enlarged diameter portion 62 and the handle 54 and urges the push rod 60 vertically upward as viewed in FIG. 5. A retainer clip 70 is secured to the push rod 60 underneath the handle 54 and limits the upward vertical travel of the push rod 60 relative to the handle 54.

With reference now to FIGS. 1, 2, and 6, the operation of the device 10 of the present invention will now be described. As shown in FIG. 1, the device 10 is there shown submerged within an aquarium tank 72 having a layer of aggregate, gravel, or the like 74 along its bottom. A series pump 76 and filter 77 arrangement, illustrated diagrammatically, includes an intake line 78 which draws water from the aquarium 72 and a return line 80 which returns the filtered water to the aquarium 72. The intake line 78 of the pump 76 can be coupled to the fluid outlet 36 of the device 10. Similarly, a fluid carrying means, such as a tube 82, is coupled at one end to the fluid inlet 42 of the upper housing portion 14 and at its other end extends downward into the gravel 74.

The device 10 is connected to the pump 76 and filter 77 by the intake line 78 and is first submerged in the aquarium 72 thus filling the chambers 22 and 24 with water. Upon actuation of the pump 76, the pump 76 draws water and gravel 74 up through the tube 82 and into the upper chamber 22 of the upper housing portion 14. Due to the water suction from the pump 76, the closure lid 28 is maintained in a closed position covering the lower axial end of the lower housing portion 16. However, in order to assure prompt closure of the lid 28, a styrofoam ball 84, or the like, is preferably secured to the closure lid 28 so that the natural floatation of the ball 84 initially closes the lid 28.

Due to the tangential projection of the fluid inlet 42 into the upper housing chamber 22, the gravel and water mixture travels in a vortex within the upper housing chamber 22 as best shown by arrows 90 in FIG. 6. The vortex causes the accumulated debris and waste to be separated from the gravel 74. The resultant water and waste mixture flows through the openings 48 in the sieve 46 and is pumped to the filter 76. The openings 48 in the sieve 46 are small enough, however, to prohibit passage of the gravel 74 through the sieve 46 thus retaining the gravel 74 within the upper housing chamber 22.

After a short washing period, the gravel 74, due to both its weight and the influx of more gravel 74 into the upper chamber 22, falls to the bottom of the chamber 22, through the opening 26 and into the lower housing chamber 24 where it accumulated as shown at 86. Referring now particularly to FIG. 2, after the desired amount of washed gravel accumulates within the lower housing chamber 24, visible due to the transparency of the housing 12, the push rod 60 is depressed against the force of the spring 58 so that the lower end of the push rod 60 contacts and opens the closure lid 28. Upon opening of the closure lid 28, the washed gravel accumulated within the lower housing chamber 24 is dumped and returned to the bottom of the aquarium tank 72. It will be understood, of course, that the above described procedure is repeated until the desired amount of aquarium gravel 74 has been cleaned.

It can thus be seen that the device 10 of the present invention provides a novel means for cleaning aquarium gravel and the like without removal of the water and aquatic animals from the aquarium.

Having thus described my invention, many modifications thereto will become apparent to those skilled in the art to which it pertains without departing from the spirit of the invention as defined by the scope of the appended claims.

I claim:

1. For use with an aquarium carrying aggregate along its bottom, a device comprising, a housing having an interior chamber, means for drawing said aggregate into said housing chamber, and drawing means further comprising a pump having an intake line, fluid passage means open at one end to said housing chamber and adapted to engage the aggregate at its other end, said intake line being coupled to said housing chamber to thereby draw a water and aggregate mixture through said fluid passage means and into said housing chamber, means for washing said aggregate in said housing chamber, said washing means further comprising a tubular and conically shaped sieve mounted in said housing chamber, said seive having its interior open to the intake line and its exterior open to the fluid passage to the intake line and its exterior open to the fluid passage means, means for returning the washed aggregate to said aquarium, and wherein said fluid passage means projects the water and aggregate mixture tangentially into said housing chamber whereby said fluid stream circulates in a vortex around said sieve.

2. The invention as defined in claim 1 wherein said fluid passage means is a tube.

3. The invention as defined in claim 1 wherein said housing includes a second chamber disposed beneath and open to said first mentioned chamber so that the washed aggregate falls from said first chamber to said second chamber.

4. The invention as defined in claim 3 wherein said second chamber is open at its bottom and wherein said returning means comprises means for closing the bottom of said second chamber and means for selectively opening said closing means to thereby dump the aggregate within said second chamber into said aquarium.

5. The invention as defined in claim 4 wherein said closing means comprises a hinged closure lid adapted to cover the bottom opening of said second chamber.

6. The invention as defined in claim 4 wherein said closing means comprises a pivotally mounted lid retained in a closed position by the water suction from the intake line.

7. The invention as defined in claim 6 wherein said closing means further comprises floatation means secured to said lid.

8. For use with an aquarium carrying aggregate along its bottom, a device comprising,
 a housing having an interior chamber,
 means for drawing said aggregate into said housing chamber, wherein said drawing means comprises a pump having an intake line, fluid passage means open at one end to said housing chamber and adapted to engage the aggregate at its other end, said intake line being coupled to said housing chamber to thereby draw a water and aggregate mixture through said fluid passage means and into said housing chamber,
 means for washing said aggregate in said housing chamber,
 means for returning the washed aggregate to said aquarium,
 wherein said washing means further comprises a sieve mounted in said housing chamber and operatively disposed between said intake line and said fluid means,
 wherein said housing includes a second chamber open at its bottom disposed beneath and open to said first mentioned chamber so that the washed aggregate falls from said first chamber to said second chamber, and
 wherein said returning means comprises means for closing the bottom of said second chamber and means for selectively opening said closing means to thereby dump the aggregate within said second chamber into said aquarium.

9. The invention as defined in claim 8 wherein said closing means comprises a hinged closure lid adapted to cover the bottom opening of said second chamber.

10. The invention as defined in claim 8 wherein said closing means comprises a pivotally mounted lid retained in a closed position by the water suction from the intake line.

11. The invention as defined in claim 10 wherein said closing means further comprises floatation means secured to said lid.

12. For use with an aquarium carrying aggregate along its bottom, a device comprising,
 a housing having a first interior chamber and a second interior chamber disposed beneath the first chamber, said second chamber being open on its bottom,
 means for drawing said aggregate into said first housing chamber,
 means for washing said aggregate in said first housing chamber, wherein the washed aggregate falls from said first chamber to said second chamber,
 means for returning the washed aggregate to said aquarium, said returning means further comprising means for closing the bottom of said second chamber and means for selectively opening said closing means to thereby dump the washed aggregate within said second chamber into said aquarium.

13. The invention as defined in claim 12 wherein said drawing means comprises a pump having an intake line, fluid passage means open at one end to said housing chamber and adapted to engage the aggregate at its other end, said intake line being coupled to said housing chamber to thereby draw a water and aggregate mixture through said fluid passage means and into said housing chamber.

14. The invention as defined in claim 13 wherein said washing means further comprises a sieve mounted in said housing chamber and operatively disposed between said intake line and said fluid passage means.

15. The invention as defined in claim 14 wherein said sieve is tubular and conically shaped with its interior open to the intake line and its exterior open to the fluid passage means.

16. The invention as defined in claim 15 wherein said washing means comprises fluid passage means projecting the water and aggregate mixture tangentially into said housing chamber whereby said fluid stream circulates in a vortex around said sieve.

17. The invention as defined in claim 12 wherein said closing means comprises a pivotally mounted lid retained in a closed position by the water suction from the intake line.

18. The invention as defined in claim 17 wherein said closing means further comprises floatation means secured to said lid.

19. The invention as defined in claim 12 wherein said closing means comprises a hinged closure lid adapted to cover the bottom opening of said second chamber.

* * * * *